United States Patent
Aizenbud-Reshef et al.

(10) Patent No.: US 7,831,608 B2
(45) Date of Patent: Nov. 9, 2010

(54) SERVICE IDENTIFICATION IN LEGACY SOURCE CODE USING STRUCTURED AND UNSTRUCTURED ANALYSES

(75) Inventors: Netta Aizenbud-Reshef, Haifa (IL); Ksenya Kveler, Yokne'am Ilit (IL); Inbal Ronen, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 12/038,823

(22) Filed: Feb. 28, 2008

(65) Prior Publication Data

US 2009/0222429 A1  Sep. 3, 2009

(51) Int. Cl.
G06F 17/00 (2006.01)
G06F 9/45 (2006.01)

(52) U.S. Cl. .................. 707/758; 717/136; 717/142

(58) Field of Classification Search ............ 707/758; 717/126, 136–137, 141–421
See application file for complete search history.

(56) References Cited

U.S. PATENT DOCUMENTS

| | | | |
|---|---|---|---|
| 5,432,942 A | | 7/1995 | Trainer |
| 6,353,925 B1 | | 3/2002 | Stata et al. |
| 7,454,399 B2 * | | 11/2008 | Matichuk ............... 706/53 |
| 2003/0056192 A1 | | 3/2003 | Burgess |
| 2004/0154000 A1 | | 8/2004 | Kasravi et al. |
| 2005/0021689 A1 | | 1/2005 | Marvin et al. |
| 2005/0027495 A1 * | | 2/2005 | Matichuk ............... 703/2 |
| 2005/0149558 A1 * | | 7/2005 | Zhuk ............... 707/104.1 |
| 2005/0243604 A1 * | | 11/2005 | Harken et al. ......... 365/185.22 |
| 2005/0251533 A1 * | | 11/2005 | Harken et al. ......... 707/104.1 |
| 2005/0256892 A1 * | | 11/2005 | Harken ............... 707/101 |
| 2006/0031228 A1 * | | 2/2006 | Bosworth et al. .......... 707/10 |
| 2006/0031264 A1 * | | 2/2006 | Bosworth et al. .......... 707/200 |
| 2006/0048093 A1 | | 3/2006 | Jain et al. |
| 2006/0117073 A1 * | | 6/2006 | Bosworth et al. .......... 707/201 |
| 2006/0143594 A1 | | 6/2006 | Grimaldi |
| 2006/0212464 A1 | | 9/2006 | Pedersen |
| 2006/0248519 A1 * | | 11/2006 | Jaeger et al. ........... 717/141 |
| 2006/0294502 A1 | | 12/2006 | Das |
| 2007/0028208 A1 * | | 2/2007 | Maki ................. 717/106 |

OTHER PUBLICATIONS

Papazoglou, Mike P., et al., "Service Oriented Architectures: Approaches, Technologies and Research Issues", The VLDB Journal, vol. 16, Issue 3, Jul. 2007, pp. 389-415.*

(Continued)

Primary Examiner—Robert Stevens

(57) ABSTRACT

Identifying service candidates in legacy source code, including a source code analyzer performing structured and unstructured analyses of computer software source code procedures, a repository storing results of the analyses, a target profile analyzer analyzing a target service description of a Service Oriented Architecture and formulating a query therefrom, a search module querying the repository to identify source code elements that match the target service description, and combining any matches within a predefined distance from each other within the source code, a ranking engine ranking the combined matches in accordance with predefined heuristics, and a procedure aggregator aggregating the combined matches by their location in propinquity to the procedures, comparing interface definitions defined for the service description to entry and exit points of the procedures to identify candidate procedures having similar input and output parameters, and producing a ranked list of candidate procedures that map into the target element.

24 Claims, 3 Drawing Sheets

OTHER PUBLICATIONS

Zimmerman, Olaf, et al., "Service-Oriented Architecture and Business Process Choreography in an Order Management Scenario: Rationale, Concepts, Lessons Learned", OOPSLA '05, San Diego, CA, Oct. 16-20, 2005, pp. 301-312.*

Lewis, Grace, et al., "Developing Realistic Approaches for the Migration of Legacy Components to Service-Oriented Architecture Environments", TEAA 2006, LNCS 4473, Berlin, Germany, Nov. 29-Dec. 1, 2006, pp. 226-240.*

Cao, Fei, et al., "Model-Driven Reengineering Legacy Software Systems to Web Services", Defense Technical Information Center, downloaded from: http://handle.dtic.mil/100.2/ADA494794, © 2005, pp. i and 1-24.*

Rezgui, Y., "Role-Based Service-Oriented Implementation of a Virtual Enterprise: A Case Study in the Construction Sector", Computers in Industry, vol. 58, Issue 1, Jan. 2007, pp. 74-86.*

Walker, L., "IBM Business Transformation Enabled by Service-Oriented Architecture", IBM Systems Journal, vol. 46, Issue 4, Oct. 2007, pp. 651-667.*

Zhang, Zhuopeng, et al., "Service Identification and Packaging in Service Oriented Reengineering", SEKE '05, Knowledge Systems Institute Graduate School, © 2005, pp. 1-6.*

Zimmerman, Olaf, et al., "Elements of Service-Oriented Analysis and Design", developerWorks, Jun. 2, 2004, downloaded from: www.ibm.com/developerworks/webservices/library/ws-soad1, pp. 1-23.*

Channabasavaiah, Kishore, et al., "Migrating to a Service-Oriented Architecture", IBM Global Service White Paper, G224-7298-00, Apr. 2004, pp. 1-22.*

Lewis, Grace, et al., "SMART: The Service-Oriented Migration and Reuse Technique", Carnegie Mellon University Technical Note, CMU/SEI-2005-TN-029, Sep. 2005, 39 pages.*

Schmidt, Marc-Thomas, et al., "The Enterprise Service Bus: Making Service-Oriented Architecture Real", IBM Systems Journal, vol. 44, No. 4, © 2005, pp. 781-797.*

Wuest, Bjoern, "Framework for Middleware Executed on Mobile Devices", University of Kassel Dissertation, Kassel, Germany, © 2005, 115 pages.*

H. Sneed, "Wrapping Legacy Software for Reuse in a SOA", (http://wi.wu-wien.ac.at/home/mendling/XML4BPM2006/XML4BPM-Sneed.pdf), Mar. 12, 2008, 15 pages.

Sourceforge, "Codecrawler", 2005 (http://codecrawler.sourceforge.net/index.htm and http://codecrawler.sourceforge.net/features,htm), 4 pages.

S. Bajracharya et al., "Sourcerer: A Search Engine for Open Source Code Supporting Structure-Based Search", OOPSLA'06 Oct. 22-26, 2006, Portland, Oregon, USA. (http://sourcerer.ics.uci.edu/publication/oopsla-06-poster-abstract.pdf), 2 pages.

Grace Lewis et al., "Analyzing the reuse potential of migrating legacy components to a service-oriented architecture", Proceedings of the Conference on Software Maintenance and Reengineering (CSMR'06) (http://ieeexplore.ieee.org/xpl/freeabs_all.jsp?arnumber=1602354), 2006, 9 pages.

* cited by examiner

SERVICE IDENTIFICATION IN LEGACY SOURCE CODE USING STRUCTURED AND UNSTRUCTURED ANALYSES

FIELD OF THE INVENTION

The present invention relates to computer systems in general, and more particularly to reusing legacy computer software when migrating to a Service Oriented Architecture (SOA).

BACKGROUND OF THE INVENTION

In recent years companies have sought to implement a more flexible and distributed information technology infrastructure that would allow them to adapt better to a rapidly changing business environment and to align their business processes and underlying applications more effectively with their evolving business goals. Still, while striving to adopt new IT architecture, companies hope to retain as much as possible of their previous IT investments. Thus, computer software reuse has become a major strategic goal of many companies.

One increasingly popular IT architecture is known as Service Oriented Architecture (SOA). One common approach for implementing SOA is by defining a target service architecture model, also called a "to-be" business model, in which the business processes and services that a company wishes to implement are described. Unfortunately, as a top-down approach, to-be modeling does not consider existing IT assets. In a different approach, an existing system is converted into SOA without regard to a business model. However, this "bottom-up" approach is not suited to companies that are moving to SOA in order to maximize their flexibility to rapidly adapt their IT to changing business needs.

SUMMARY OF THE INVENTION

The present invention in embodiments thereof maps legacy software code into defined elements of SOA.

In one aspect of the present invention a system is provided for identifying service candidates in legacy source code, the system including a source code analyzer configured to perform structured and unstructured analyses of computer software source code having a plurality of procedures, a repository for storing results of the analyses, a target profile analyzer configured to analyze a target service description of a Service Oriented Architecture (SOA) and formulate a query therefrom, a search module configured to apply the query to the repository in order to identify elements in the source code that match the target service description, and combine any of the matches that are within a predefined distance from each other within the source code, a ranking engine configured to rank any of the combined matches in accordance with at least one predefined heuristic, and a procedure aggregator configured to aggregate the combined matches by their location in propinquity to the procedures, compare interface definitions defined for the service description to entry and exit points of any of the procedures to identify candidate procedures having input and output parameters similar to those of said interface definitions, and produce a ranked list of candidate procedures that map into the target element.

In another aspect of the present invention any of the elements is implemented in computer hardware and/or in computer software embodied in a computer-readable medium.

In another aspect of the present invention the system further includes at least one thesaurus including any of word synonyms and abbreviations and their mappings to other words.

In another aspect of the present invention the source code analyzer is configured to analyze at least one comment in the source code to identify any characteristic of any product of the structured analysis in propinquity to the comment.

In another aspect of the present invention the source code analyzer is configured to identify the type of a source code element, the name of the element, and the location within the source code where the element is found.

In another aspect of the present invention the source code analyzer is configured to identify any of control flow information and data flow information.

In another aspect of the present invention a method is provided for identifying service candidates in legacy source code, the method including tokenizing a target service description of a Service Oriented Architecture (SOA) into at least one token, querying a repository of source code elements using the tokens to identify a set of relevant matches in the repository and their locations within the source code, combining any of the matches that are within a predefined distance from each other within a file containing the source code, ranking any of the combined matches in accordance with at least one predefined heuristic, aggregating the ranked matches by procedure within the source code, combining the rankings of the aggregated matches for any of the procedures into a score that represents a rank for the procedure for the query, comparing interface definitions defined for the service description to entry and exit points of any of the procedures to identify candidate procedures having input and output parameters similar to those of said interface definitions, and presenting the candidate procedures together with the score.

In another aspect of the present invention the tokenizing step includes tokenizing the service description using the same tokenization technique that was used to tokenize the source code when building the repository.

In another aspect of the present invention the querying step includes employing stemming techniques, predefined thesauri, and predefined abbreviation lists to find inexact matches.

In another aspect of the present invention the querying step includes employing domain-specific thesauri and abbreviation lists.

In another aspect of the present invention the combining step includes combining only where the matches that meet the distance criteria are found within the same source code element.

In another aspect of the present invention the combining step includes combining only where the matches that meet the distance criteria are found within the same sentence.

In another aspect of the present invention the ranking step includes weighting the rank in accordance with a weight predefined for the heuristic. In another aspect of the present invention the aggregating step includes aggregating any of the ranked matches that fall within a comment in propinquity to a procedure declaration of the procedure, within the procedure declaration, or within the body of the procedure.

In another aspect of the present invention a method is provided for identifying service candidates in legacy source code, the method including performing structured and unstructured analyses of computer software source code having a plurality of procedures, storing results of the analyses in a repository, analyzing a target service description of a Service Oriented Architecture (SOA), formulating a query from the results of the analysis, applying the query to the repository in order to identify elements in the source code that match the target service description, combining any of the matches that are within a predefined distance from each other within the source code, ranking the combined matches in accordance with at least one predefined heuristic, aggregating the combined matches by their location in propinquity to the procedures, comparing interface definitions defined for the service description to entry and exit points of any of the procedures to identify candidate procedures having input and output parameters similar to those of said interface definitions, and producing a ranked list of candidate procedures that map into the target element.

In another aspect of the present invention a computer program is provided embodied on a computer-readable medium, the computer program including a code segment operative to tokenize a target service description of a Service Oriented Architecture (SOA) into at least one token, a code segment operative to query a repository of source code elements using the tokens to identify a set of relevant matches in the repository and their locations within the source code, a code segment operative to combine any of the matches that are within a predefined distance from each other within a file containing the source code, a code segment operative to rank any of the combined matches in accordance with at least one predefined heuristic, a code segment operative to aggregate the ranked matches by procedure within the source code, a code segment operative to combine the rankings of the aggregated matches for any of the procedures into a score that represents a rank for the procedure for the query, a code segment operative to compare interface definitions defined for the service description to entry and exit points of any of the procedures to identify candidate procedures having input and output parameters similar to those of said interface definitions, and a code segment operative to present the candidate procedures together with the score.

In another aspect of the present invention the code segment operative to tokenize is operative to tokenize the service description using the same tokenization technique that was used to tokenize the source code when building the repository.

In another aspect of the present invention the code segment operative to tokenize is operative to query is operative to employ stemming techniques, predefined thesauri, and predefined abbreviation lists to find inexact matches.

In another aspect of the present invention the code segment operative to query employs domain-specific thesauri and abbreviation lists.

In another aspect of the present invention the code segment operative to combine matches is operative to combine only where the matches that meet the distance criteria are found within the same source code element.

In another aspect of the present invention the code segment operative to combine matches is operative to combine only where the matches that meet the distance criteria are found within the same sentence.

In another aspect of the present invention the code segment operative to rank is operative to weight the rank in accordance with a weight predefined for the heuristic.

In another aspect of the present invention the code segment operative to aggregate is operative to aggregate any of the ranked matches that fall within a comment in propinquity to a procedure declaration of the procedure, within the procedure declaration, or within the body of the procedure.

In another aspect of the present invention a computer program is provided embodied on a computer-readable medium, the computer program including a code segment operative to perform structured and unstructured analyses of computer software source code having a plurality of procedures, a code segment operative to store results of the analyses in a repository, a code segment operative to analyze a target service description of a Service Oriented Architecture (SOA), a code segment operative to formulate a query from the results of the analysis, a code segment operative to apply the query to the repository in order to identify elements in the source code that match the target service description, a code segment operative to combine any of the matches that are within a predefined distance from each other within the source code, a code segment operative to rank the combined matches in accordance with at least one predefined heuristic, a code segment operative to aggregate the combined matches by their location in propinquity to the procedures, a code segment operative to compare interface definitions defined for the service description to entry and exit points of any of the procedures to identify candidate procedures having input and output parameters similar to those of said interface definitions, and a code segment operative to produce a ranked list of candidate procedures that map into the target element.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

Figure 1:
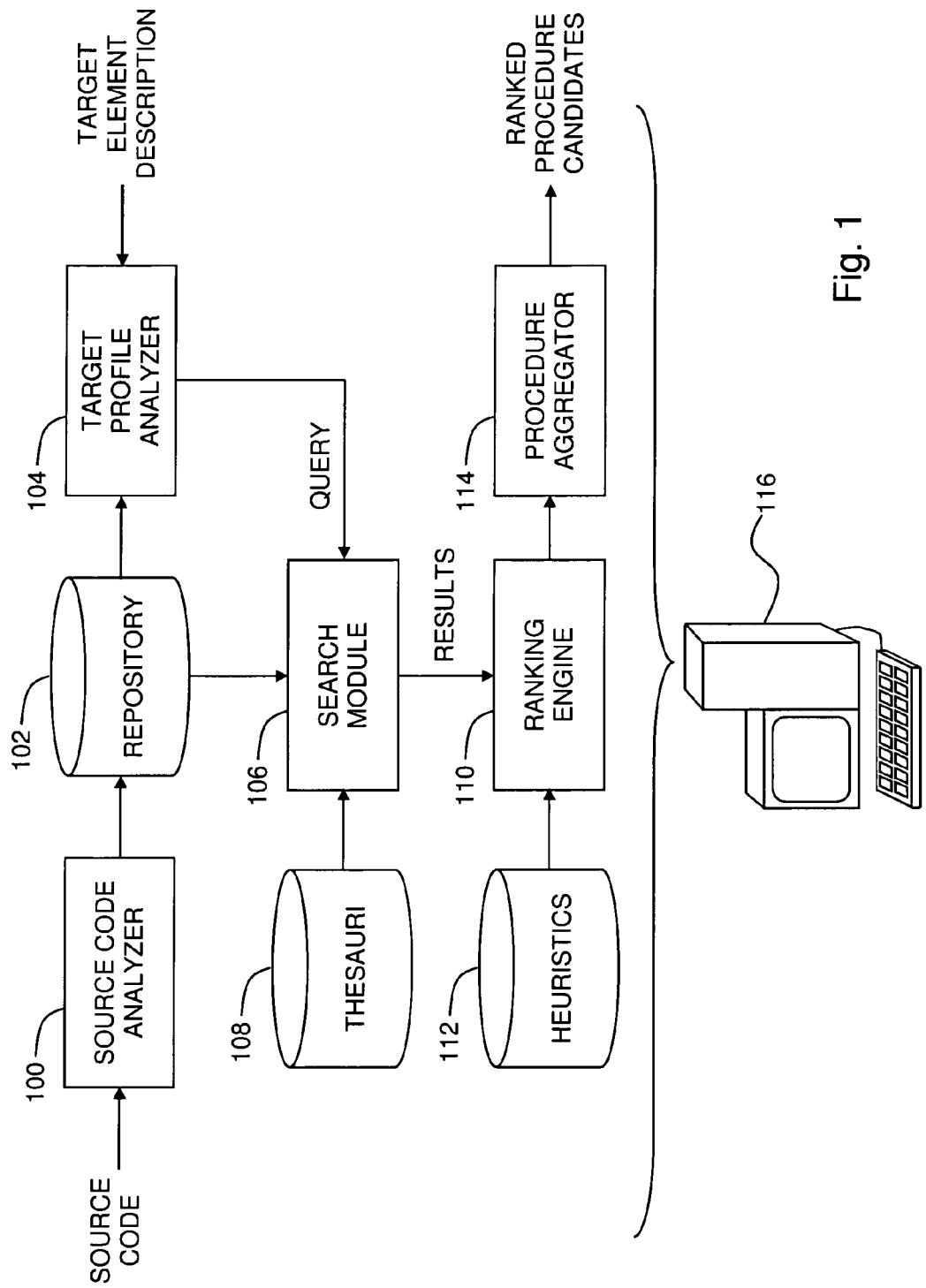
FIG. 1 is a simplified conceptual illustration of a system for mapping legacy source code to SOA, constructed and operative in accordance with an embodiment of the present invention.

Reference is now made to FIG. 1, which is a simplified conceptual illustration of a system for mapping legacy source code to SOA, constructed and operative in accordance with an embodiment of the present invention. In the system of FIG. 1 a source code analyzer 100 performs structured and unstructured analyses of the computer software source code, such as in accordance with the method described hereinbelow with reference to FIG. 2A. The results of the analysis performed by source code analyzer 100 are stored in a repository 102. A target profile analyzer 104 analyzes a description of a target element of a computer software architecture, such as a SOA service description, to formulate a query for use by a search module 106 and a ranking Engine 110. Search module 106 applies the query to repository 102, such as in accordance with the method described hereinbelow with reference to FIG. 2A, in order to identify elements in the source code that match the target element. Search module 106 applies unstructured analysis techniques, optionally employing one or more thesauri 108 including word synonyms and abbreviations to aid in the search. The search results are then ranked by ranking engine 110 in accordance with one or more predefined heuristics 112. A procedure aggregator 114 then aggregates the ranked results by the source code procedures where the source code elements in the search results are found, finally producing a ranked list of candidate procedures that map into the target element. Any of the elements shown in FIG. 1 are executed by or otherwise accessible to a computer 116, such as by implementing any of the elements shown in FIG. 1 in computer hardware and/or in computer software embodied in a computer-readable medium.

Figure 2A:
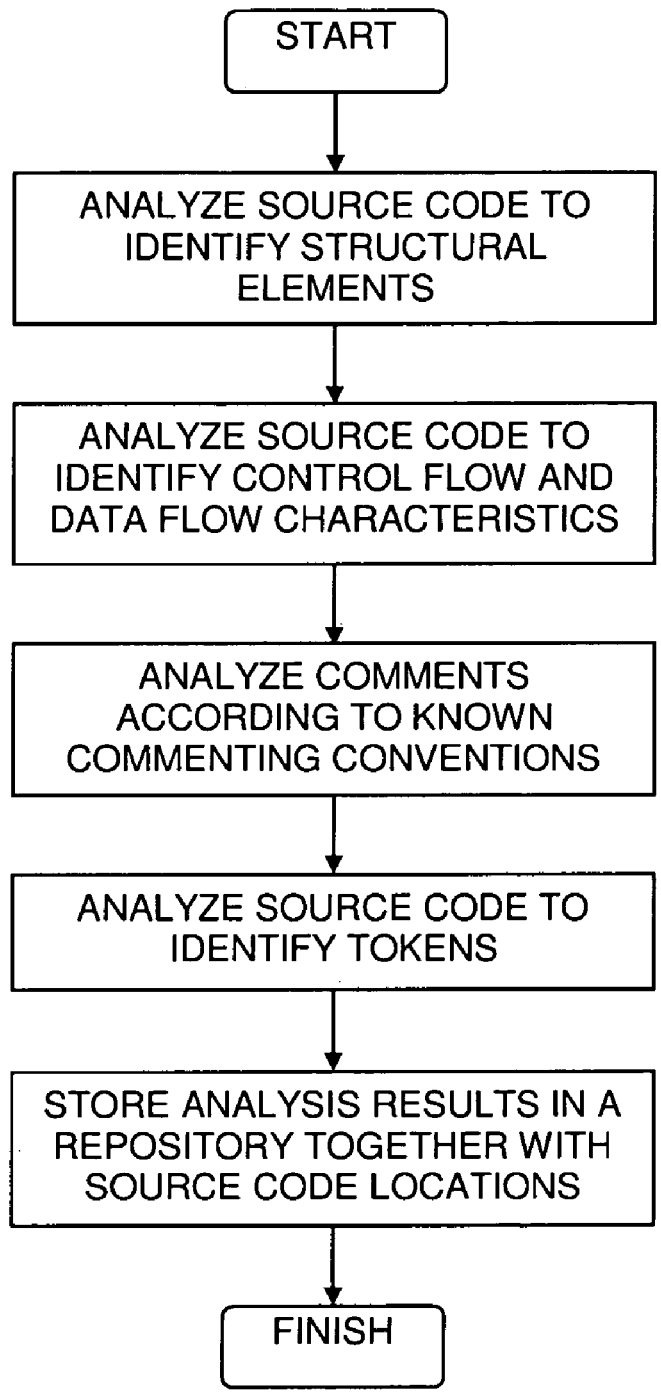
FIG. 2A is a simplified flowchart illustration of an exemplary method of constructing the repository of FIG. 1, operative in accordance with an embodiment of the present invention.

Reference is now made to FIG. 2A, which is a simplified flowchart illustration of an exemplary method of constructing the repository of FIG. 1, operative in accordance with an embodiment of the present invention. In the method of FIG. 2A, source code is analyzed in accordance with conventional structured analysis techniques. The product of this analysis typically includes structural elements, such as variable declarations, procedure names, and comments, control flow and data flow information within the source code, and any other information produced by known structured analysis techniques. Information regarding any elements identified during this analysis is preferably stored in a repository, with the information preferably including the type of element found (e.g., variable declaration, procedure name, comment), the name of the element (e.g., variable name, procedure name), and the location within the source code where the element is found. Control flow and data flow information is also preferably stored in the repository in accordance with conventional techniques, such as by storing control flow information as a graph, and storing data flow information by keeping for each variable the location where it is used and where it is altered. Any other information regarding source code that may be discovered using conventional structured analysis techniques may be identified and stored in the repository as well.

Comments within the source code are preferably broken into sentences. Predefined information regarding commenting conventions is also preferably exploited to extract information from comments. For example, where it is known that the source code employs a commenting convention that dictates that procedures be preceded by a comment including a "PROC:" label followed by a description of the procedure's functionality, this information may be identified as such. Thus in the COBOL code snippet below, the procedure "P0040-PROC1" may be identified as relating to account creation functionality even though the procedure name itself does not indicate this.

```
    . . .
    214000 PROCEDURE DIVISION
    214100**********************************
    214200* PROC: ACCOUNT ADDITION.
    214800**********************************
    215000 P0040-PROC1.
    215150*** INITIALIZE NUMBER BEFORE ADDING
    215200     MOVE +0 TO ACNT-NUMBER
```

In the repository a comment annotation is preferably associated with the code section between lines 214100 and 214800, a procedure declaration annotation is preferably associated with the procedure declaration element at the line 215000, and a procedure functionality annotation is preferably associated with the comment fragment containing the "ACCOUNT ADDITION" string.

In addition to the code structure analysis described above, the source code is parsed using conventional unstructured analysis techniques to identify tokens. This tokenization process is preferably performed without regard to the role of the text within the source code. Thus, comments and program instructions are tokenized in the same manner. The tokenization preferably employs predefined information, such as special characters (e.g., spaces, commas, underscores, etc.) and common code naming practices, such as Hungarian notation or CamelCase, to identify individual tokens within unbroken text elements. For example, the procedure name "P0030-PROC-CREATE-ACCT" is preferably broken into separate tokens as "POO30," "PROC," "CREATE," and "ACCT." A predefined list of words having a low semantic value (e.g., "and," "the") may be consulted, and tokens that are found on the list are preferably excluded from the analysis results. The tokens resulting from the analysis are then stored in the repository together with the location within the source code where the token is found, including sentence break locations.

Figure 2B:
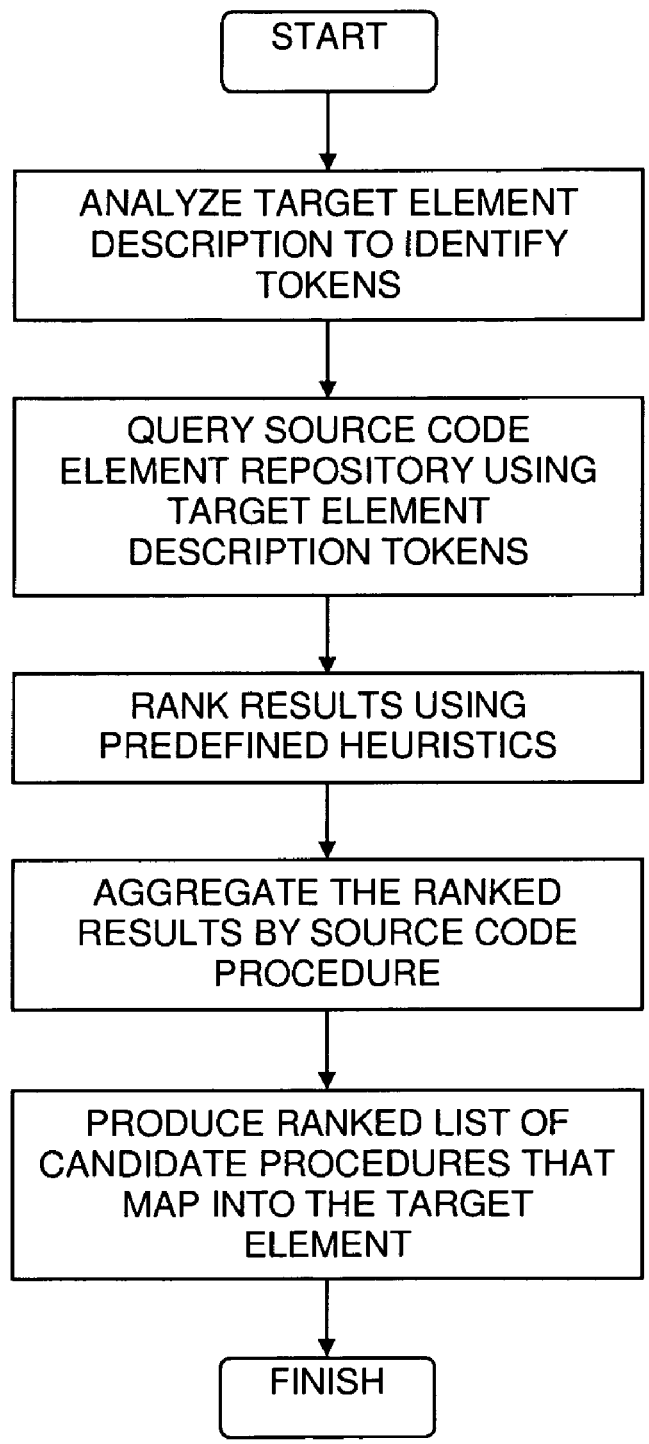
FIG. 2B is a simplified flowchart illustration of an exemplary method of using the repository of FIG. 1 to map legacy source code to SOA, operative in accordance with an embodiment of the present invention.

Reference is now made to FIG. 2B, which is a simplified flowchart illustration of an exemplary method of using the repository of FIG. 1 to map legacy source code to SOA, operative in accordance with an embodiment of the present invention. In the method of FIG. 2B, a description of a target element of a computer software architecture, such as a SOA service description, is tokenized, preferably using the same tokenization technique that was used to tokenize the source code when building the repository as described above. First, the title of the target element is tokenized. For example, the title "Add an account" yields the tokens "Add," "an," and "account." As before, tokens with a low semantic value (e.g., "an" in the example) are preferably excluded from the tokenization results. The repository is then queried by a search module using the tokens from the element title. Conventional unstructured analysis techniques, such as those that employ stemming techniques, predefined thesauri, and predefined abbreviation lists, are preferably used to expand the search to inexact matches. For example, the "P0030-PROC-CREATE-ACCT" procedure name includes the abbreviation "ACCT" that maps to the word "account," and the word "CREATE" that maps to the synonym "add." Domain-specific thesauri and abbreviation lists may be used, such as, for example, where they include banking terminology and abbreviations where the source code is a banking application.

After performing the query, the search module returns a set of relevant matches among the source code artifacts and tokens in the repository, as well as the location of each match within the source code. For example, for the target element title "Add an account," the query result might contain matches in the source code for "add," "create," "account," and "record" once stemming, thesauri, and abbreviation mapping are applied. The search module then preferably combines multiple matches that are within a predefined distance from each other within the same source code file. For example, if the word "add" and the word "account" (or synonyms, stems, abbreviations, etc. of either words) are found in a source code file as a result of a query for "Add an account", and are within a predefined distance from one another, then the matches may be combined into a single match as "add account". Each match may be combined more than once, such as where two matches of "add" and two matches of "account" within the same source code file and all within the predefined distance from one another yield four different combinations of "add account." Tokens with a low semantic value (e.g., "an" in the example) are preferably ignored when calculating distances between matches. Matches that meet the distance criteria may optionally be limited to matches that are found within the same source code element, such as where the match "add" found within a function is not combined with the match "account" found within a comment that precedes the function despite the matches being within the predefined distance from each other. Matches found within a comment that meet the distance criteria may optionally be limited to matches that occur within the same sentence. Thus, for example, for a target service title "Open Account," occurrences of "open" and "account" are not combined if they appear within a comment as " . . . account. Open . . . ".

The relevance of each match or match combination is then determined by considering its structural and semantic context in accordance with one or more predefined heuristics. For example, the textual similarity between the match and the target element title is evaluated. A match is ranked higher if it is an exact match, and lower if the match resulted from stemming or another transformation (e.g., mapping to a synonym, an abbreviation, or other word) of the input target element title tokens. For example, for the target element title "Add an account," the procedure "P0030-PROC-CREATE-ACCT" includes the matches "CREATE" and "ACCT" and gets a lower ranking than it would have if it had included exact matches for both "ADD" and "ACCOUNT." Each heuristic may have a separately configurable weight that can be set by the user. Conventional machine learning techniques may be used to automatically assign optimal weights.

Other examples of heuristics that may be applied to matches include:
  Matches that are located in or close to a variable declaration are not taken into account. Instead, use the results from the data flow analysis to find the location in the code where the variable is referenced. The procedure referencing the variable is identified as a match with low ranking.
  Where a match is located in a comment adjacent to a procedure declaration and another match is located in the procedure declaration itself, rank the procedure higher than if there is no match in the comment.
  Use natural language processing to identify the main noun and the main verb that constitute the subject and action in the target element title. First, look for noun matches that are located at or close to a variable declaration. Next, look for verb matches that are located at or close to code statements that reference this variable. The procedure referencing the variable is identified as a candidate for use as the target element. For this heuristic additional separate searches may be run for the noun and the verb. Alternatively, for object-oriented languages, look for class names that include the noun, and method names that include the verb. Alternatively, look for matches that include the verb in the procedure declaration and the noun as one of its parameter names or variable names inside the procedure body.
  When "CRUDL" (Create, Read, Update, Delete, or List) constructs appear in the target element title (e.g., "create"), identify language constructs that perform creation of objects of types that appear in the title, such as "SQL INSERT," "new," and "malloc" statements in code, giving a higher ranking to code segments that include them.

Once the heuristics have been applied to rank the results of the query, the ranked results are aggregated to the procedure level within the source code. Thus, results that fall within the bounds of a procedure, (e.g. on a comment before/after the procedure declaration, on the procedure declaration, any match in the body of the procedure) are aggregated, combining each individual ranking into one score that represents a rank for the entire procedure for the current query. The combination is preferably based on predefined weights given to each type of a match (i.e., procedure declaration, procedure body, etc.), and the total rank is calculated by summing up the individual match ranks, each multiplied by its associated weight.

The heuristics need not be specific to a programming language, but may rather be based on the general semantics of programs, particularly where concepts such as "procedure declaration," "variable declaration," and "comment" are used in the repository as non-language-specific annotations. Thus, the searching and ranking may be performed independent from the specific programming language from which the annotations were derived.

Once candidate procedures are identified for the target element, interface definitions that have been defined for the target element may be compared to the entry and exit points of the identified candidate procedures to identify any candidate procedures having input and output parameters similar to those of the interface definitions, such as by comparing the number of input and output parameters, their types, and their names. Each candidate procedure preferably receives a rank that indicates the percentage in which it is similar to the interface definition. Candidate procedures that match the interface definitions may be presented to a user together with an indication of the degree of the match, which may be in the form of a new score that is calculated by combining the score mentioned above with the percentage rank from the interface matching stage. This combination may be determined as the product of these values.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

What is claimed is:

1. A system for identifying service candidates in legacy source code, the system comprising:
  a source code analyzer configured to perform structured and unstructured analyses of computer software source code having a plurality of procedures; a repository for storing results of said analyses;
  a target profile analyzer configured to analyze a target service description of a Service Oriented Architecture (SOA) and formulate a query therefrom;
  a search module configured to apply said query to said repository in order to identify elements in said source code that match said target service description, and combine any of said matches that are within a predefined distance from each other within said source code;
  a ranking engine configured to rank any of said combined matches in accordance with at least one predefined heuristic; and
  a procedure aggregator configured to
  aggregate said combined matches by their location in propinquity to said procedures,
  compare interface definitions defined for said service description to entry and exit points of any of said procedures to identify candidate procedures having input and output parameters similar to those of said interface definitions, and
  produce a ranked list of candidate procedures that map into said target service description.

2. A system according to claim 1 wherein any of said elements is implemented in computer hardware and/or in computer software embodied in a computer-readable medium.

3. A system according to claim 1 and further comprising at least one thesaurus including any of word synonyms and abbreviations and their mappings to other words.

4. A system according to claim 1 wherein said source code analyzer is configured to analyze at least one comment in said source code to identify any characteristic of any product of said structured analysis in propinquity to said comment.

5. A system according to claim 1 wherein said source code analyzer is configured to identify the type of a source code element, the name of said element, and the location within said source code where said element is found.

6. A system according to claim 1 wherein said source code analyzer is configured to identify any of control flow information and data flow information.

7. A method for identifying service candidates in legacy source code, the method comprising:
 tokenizing a target service description of a Service Oriented Architecture (SOA) into at least one token;
 querying a repository of source code elements using said tokens to identify a set of relevant matches in said repository and their locations within said source code;
 combining any of said matches that are within a predefined distance from each other within a file containing said source code;
 ranking any of said combined matches in accordance with at least one predefined heuristic;
 aggregating said ranked matches by procedure within said source code;
 combining said rankings of said aggregated matches for any of said procedures into a score that represents a rank for said procedure for said query;
 comparing interface definitions defined for said service description to entry and exit points of any of said procedures to identify candidate procedures having input and output parameters similar to those of said interface definitions; and
 presenting said candidate procedures together with said score.

8. A method according to claim 7 wherein said tokenizing step comprises tokenizing said service description using the same tokenization technique that was used to tokenize said source code when building said repository.

9. A method according to claim 7 wherein said querying step comprises employing stemming techniques, predefined thesauri, and predefined abbreviation lists to find inexact matches.

10. A method according to claim 9 wherein said querying step comprises employing domain-specific thesauri and abbreviation lists.

11. A method according to claim 7 wherein said combining step comprises combining only where said matches that meet said distance criteria are found within the same source code element.

12. A method according to claim 7 wherein said combining step comprises combining only where said matches that meet said distance criteria are found within the same sentence.

13. A method according to claim 7 wherein said ranking step comprises weighting said rank in accordance with a weight predefined for said heuristic.

14. A method according to claim 7 wherein said aggregating step comprises aggregating any of said ranked matches that fall within a comment in propinquity to a procedure declaration of said procedure, within said procedure declaration, or within the body of said procedure.

15. A method for identifying service candidates in legacy source code, the method comprising:
 performing structured and unstructured analyses of computer software source code having a plurality of procedures;
 storing results of said analyses in a repository;
 analyzing a target service description of a Service Oriented Architecture (SOA);
 formulating a query from the results of the analysis;
 applying said query to said repository in order to identify elements in said source code that match said target service description;
 combining any of said matches that are within a predefined distance from each other within said source code;
 ranking said combined matches in accordance with at least one predefined heuristic;
 aggregating said combined matches by their location in propinquity to said procedures;
 comparing interface definitions defined for said service description to entry and exit points of any of said procedures to identify candidate procedures having input and output parameters similar to those of said interface definitions, and
 producing a ranked list of candidate procedures that map into said target service description.

16. A computer program embodied on a computer-readable medium, the computer program comprising:
 a code segment operative to tokenize a target service description of a Service Oriented Architecture (SOA) into at least one token;
 a code segment operative to query a repository of source code elements using said tokens to identify a set of relevant matches in said repository and their locations within said source code;
 a code segment operative to combine any of said matches that are within a predefined distance from each other within a file containing said source code;
 a code segment operative to rank any of said combined matches in accordance with at least one predefined heuristic;
 a code segment operative to aggregate said ranked matches by procedure within said source code;
 a code segment operative to combine said rankings of said aggregated matches for any of said procedures into a score that represents a rank for said procedure for said query;
 a code segment operative to compare interface definitions defined for said service description to entry and exit points of any of said procedures to identify candidate procedures having input and output parameters similar to those of said interface definitions; and
 a code segment operative to present said candidate procedures together with said score.

17. A computer program according to claim 16 wherein said code segment operative to tokenize is operative to tokenize said service description using the same tokenization technique that was used to tokenize said source code when building said repository.

18. A computer program according to claim 16 wherein said code segment operative to tokenize is operative to query is operative to employ stemming techniques, predefined thesauri, and predefined abbreviation lists to find inexact matches.

19. A computer program according to claim 18 wherein said code segment operative to query employs domain-specific thesauri and abbreviation lists.

20. A computer program according to claim 16 wherein said code segment operative to combine matches is operative to combine only where said matches that meet said distance criteria are found within the same source code element.

21. A computer program according to claim 16 wherein said code segment operative to combine matches is operative to combine only where said matches that meet said distance criteria are found within the same sentence.

22. A computer program according to claim 16 wherein said code segment operative to rank is operative to weight said rank in accordance with a weight predefined for said heuristic.

23. A computer program according to claim 16 wherein said code segment operative to aggregate is operative to aggregate any of said ranked matches that fall within a comment in propinquity to a procedure declaration of said procedure, within said procedure declaration, or within the body of said procedure.

24. A computer program embodied on a computer-readable medium, the computer program comprising:
- a code segment operative to perform structured and unstructured analyses of computer software source code having a plurality of procedures;
- a code segment operative to store results of said analyses in a repository;
- a code segment operative to analyze a target service description of a Service Oriented Architecture (SOA);
- a code segment operative to formulate a query from the results of the analysis;
- a code segment operative to apply said query to said repository in order to identify elements in said source code that match said target service description;
- a code segment operative to combine any of said matches that are within a predefined distance from each other within said source code;
- a code segment operative to rank said combined matches in accordance with at least one predefined heuristic;
- a code segment operative to aggregate said combined matches by their location in propinquity to said procedures;
- a code segment operative to compare interface definitions defined for said service description to entry and exit points of any of said procedures to identify candidate procedures having input and output parameters similar to those of said interface definitions, and
- a code segment operative to produce a ranked list of candidate procedures that map into said target service description.

* * * * *